United States Patent [19]
Wolf et al.

[11] Patent Number: 5,909,995
[45] Date of Patent: Jun. 8, 1999

[54] TRANSPORT DEVICE FOR WORKPIECES IN A VACUUM SYSTEM

[75] Inventors: Hans Wolf, Erlensee; Reiner Hinterschuster, Hammersbach; Guenter Kemmerer, Alzenau, all of Germany

[73] Assignee: Balzers Aktiengesellschaft, Furstentum, Liechtenstein

[21] Appl. No.: 08/939,027

[22] Filed: Sep. 26, 1997

[30]     Foreign Application Priority Data

Oct. 15, 1996 [CH]   Switzerland ............................ 2516/96

[51] Int. Cl.$^6$ .................................................. B65G 49/07
[52] U.S. Cl. ......................... 414/217; 414/939; 198/836.1
[58] Field of Search ................................... 414/217, 939, 414/935; 198/832, 835, 834, 836.1; 104/281, 285

[56]                References Cited

U.S. PATENT DOCUMENTS

| | | | |
|---|---|---|---|
| 4,540,326 | 9/1985 | Southworth et al. ............... | 414/217 |
| 4,892,451 | 1/1990 | Mahler ............................... | 414/939 |
| 4,918,345 | 4/1990 | Vaillant De Guelis et al. ....... | 104/281 |
| 5,133,285 | 7/1992 | Mahler et al. ...................... | 414/217 |
| 5,199,552 | 4/1993 | Dauchez ............................. | 198/834 |
| 5,387,889 | 2/1995 | Maeda et al. ....................... | 104/285 |
| 5,469,958 | 11/1995 | Gruettner et al. .................. | 198/834 |

FOREIGN PATENT DOCUMENTS

| | | | |
|---|---|---|---|
| 2128443 | 5/1990 | Japan ................................. | 414/935 |
| 6163245 | 6/1994 | Japan ................................. | 104/285 |

*Primary Examiner*—James W. Keenan
*Assistant Examiner*—Isobel A. Parker
*Attorney, Agent, or Firm*—Notaro & Michalos P.C.

[57]                 ABSTRACT

A device for transporting substrates through a vacuum system has a flat, parallel piped, plate-shaped substrate holder with upper and lower holder areas that are moveable in a vertical position along a transport path through the system. The upper part of the substrate holder is supported without contact and is movably guided by a magnetic arrangement.

12 Claims, 4 Drawing Sheets

TRANSPORT DEVICE FOR WORKPIECES IN A VACUUM SYSTEM

FIELD AND BACKGROUND OF THE INVENTION

The present invention relates to a fixing and transport device for transporting substrates into and through a vacuum treatment system comprising several stations.

The substrate holders to be used are either plate-shaped with cut-outs that accommodate the substrates, or frames with braces to which the workpieces or substrates to be processed are fixed.

A known device, for example, is described in the European patent application EP 0 544 995. A solid bottom part with two sets of wheels that correlate with one rail and one support bearing, holds a top part that is designed as a substrate holder. The bottom part serves as the base for the top part which has no other support and which is part of the transport system that transports the substrates through the vacuum treatment system. The substrate holder is only supported by this bottom part and is to be moved together with its upper part across walls and built-in parts such as laterally arranged coating sources at a constant distance.

The disadvantage of this arrangement is that the bottom part must be a very heavy construction, that it takes up much space and thereby greatly increases the height of the overall system.

Another disadvantage is that for vertical stabilization of the substrate holder the supporting component of the transport system requires a certain minimum distance to the overturning point of the substrate holder. This greatly enlarges also the vacuum chamber. In addition, such unilaterally supported transport systems have very narrow tolerances with respect to the perpendicularity of the substrate holder in relation to the process components.

The utilization of two rollers for driving and mechanical guidance of the supporting element for the substrate holder according to EP 0 544 995 has the additional disadvantage that abrasion particles are generated. Although the place where they are generated is located below the substrates, they can nevertheless penetrate into the coating zone.

SUMMARY OF THE INVENTION

The task of the present invention is to remedy said disadvantages of the described technology, and in particular to create an almost non-wearing, reduced-maintenance drive system that produces as little friction and as few particles as possible.

According to the invention the upper part of the substrate holder is guided by a magnetic bearing. This allows stable positioning of the substrate holder In the vertical axis and makes the requirements with respect to the mechanical stability of the bottom part less stringent. As a result, this bottom part can be much smaller and therefore occupies less space within the vacuum chamber and below the substrate holder. In this way the size of the vacuum chamber is essentially determined by the process components.

A friction wheel drive at the bottom part of the substrate holder produces fewer particles than the solution with two different wheels as described in EP 0 544 995. In addition, temperature induced length changes on the substrate holder and on the shaft center distances of the drive and the supporting rollers are compensated. This is particularly advantageous for vacuum processes in which, for example, the substrates must be heated up to 400° C.

Particularly advantageous in this connection is the utilization of a metal tape rather than wheels for moving the substrate holder, because the contact between the substrate holder to be driven and the metal tape is essentially continuous and free of abrasion. On said metal tape drive with wheels featuring pins along their periphery no friction occurs because there is zero slip in the drive.

Overall the arrangement according to the invention offers the following advantages. The volume of the vacuum system is now determined by the process-related installed components and limitations and can, therefore, be kept as small as possible. This allows much greater freedom in the design of the system and the process environment. The substrate holder is stabilized in its vertical position from the top for which purpose no mechanical contact above the substrate is required. This is particularly advantageous also when an elongation of the carrier occurs at elevated temperatures. The transport movement is accomplished by a minimum of mechanical contacts below the substrate level, and occurs below the process chamber, thus effectively reducing the formation of particles. If necessary, the remaining particles can be kept out of the process chamber by means of simple devices such as shielding plates.

The various features of novelty which characterize the invention are pointed out with particularity in the claims annexed to and forming a part of this disclosure and are entirely based on the Swiss priority application No. 1996 2516/96 filed Oct. 15, 1996.

BRIEF DESCRIPTION OF THE DRAWINGS

The preferred design version of the invention is subsequently explained by illustrations which serve as examples. In the drawings:

FIG. 4b is a side view of FIG. 4a.

DESCRIPTION OF THE PREFERRED EMBODIMENTS

Figure 1:
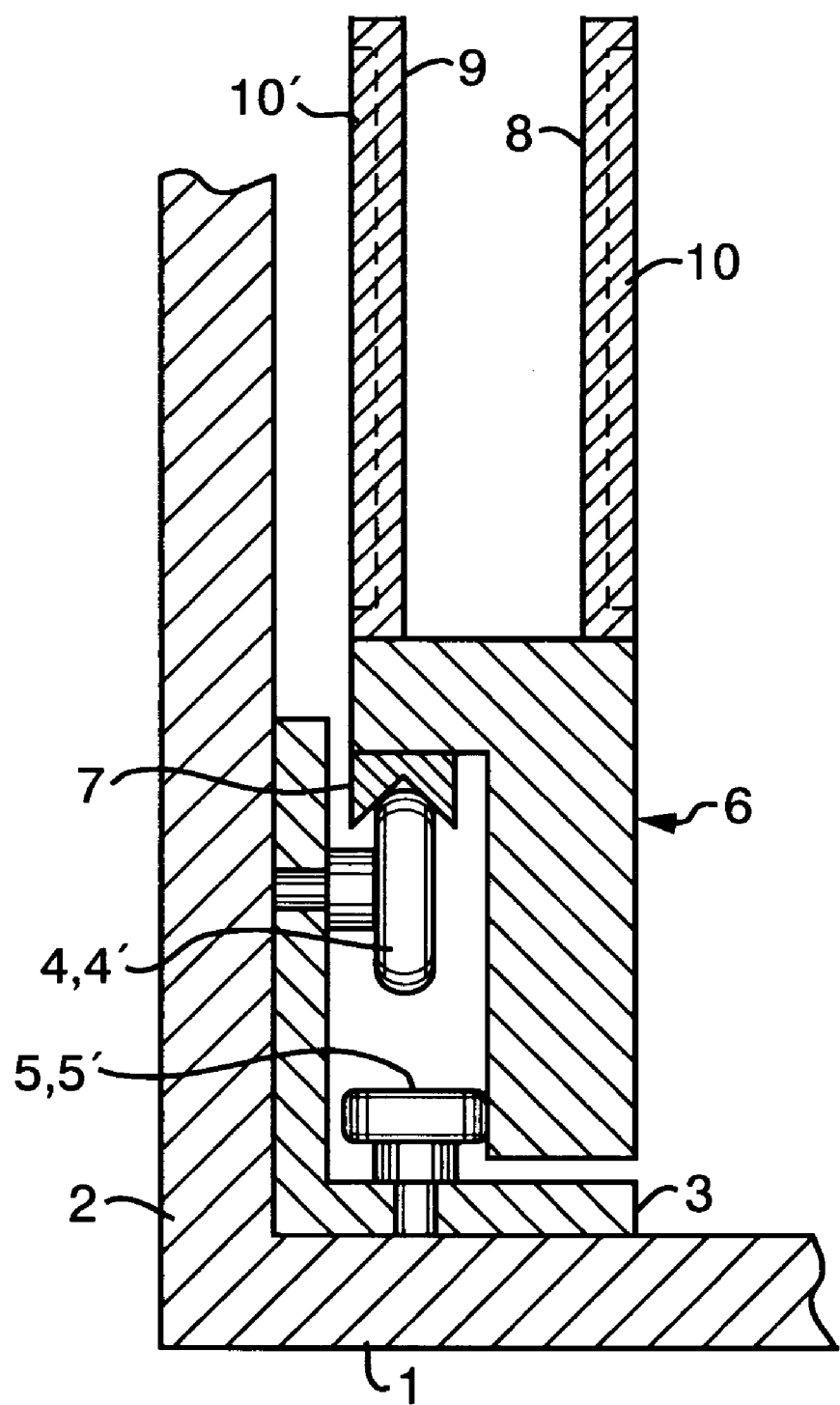
FIG. 1 is a partial sectional view of the state of the art for transporting substrates with two sets of wheels for holding and guiding the bottom part of the substrate holder arrangement.

FIG. 1 shows the design of the bottom part of a transport device according to the current state of the art. Portions of the vacuum chamber are illustrated with bottom 1 and wall 2. Two sets of wheels 4, 4' . . . and 5, 5' . . . are mounted to housing frame 3 which guide the bottom part with leg 6 and rail 7 in such a way that the entire device remains essentially fixed in the vertical direction. Vertical supports 8, 9 are fastened to leg 6 and ensure a stable, essentially vertical position of substrate holders 10, 10' mounted to these supports.

Figure 2A:
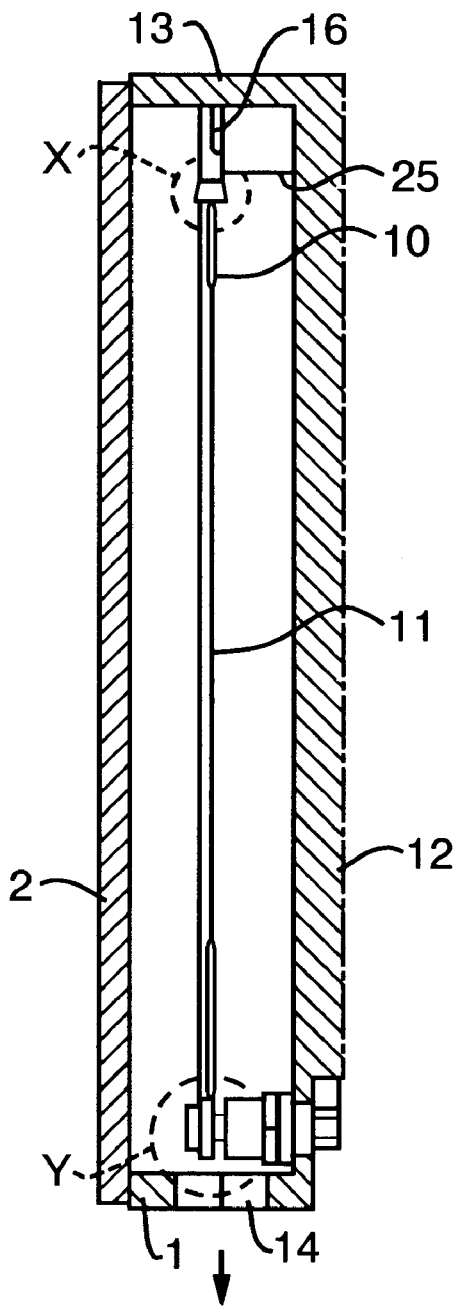
FIG. 2a is a sectional diagram showing a substrate transport device according to the invention.
Figure 2B:
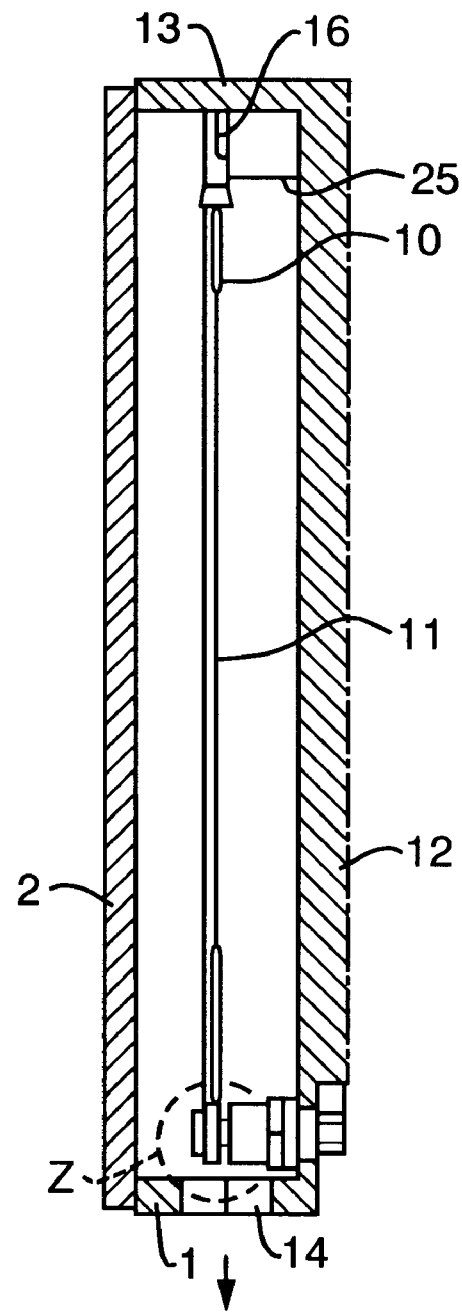
FIG. 2b is a view similar to FIG. 2a showing a further detail of the invention.

The transport device according to the invention is illustrated in FIGS. 2a and 2b, the drive version with the metal tape in FIG. 2a, and the drive version with the friction wheel in FIG. 2b. Through an appropriate control unit the transport system is able to move the substrate holder continually or intermittently so that, for example, the substrate holder is moved to a lock chamber where it stops and is moved onward at a later time. Alternatively, the substrate holder can also be moved at constant, selectable speed past a treatment station.

The essentially perpendicularly arranged substrate holder 10 is loaded with plate-shaped substrates 11 and located inside the vacuum chamber formed by bottom 1, chamber 2, and an additional wall 12 with top 13. The bottom features an opening 14 through which the chamber can be pumped down by means of a vacuum pump (not shown). The components required for treatment, such as electrodes, coating sources, etching devices, heating arrangements, etc. can be installed on chamber wall 2. Also the installation of lines (not shown) for feeding gases is possible. The other wall 12 can be fitted with a heating device (not shown) through which the substrates 11 can be heated up to the temperature required for a specific process. In the upper part, the upper edge area of the substrate holder 10 is guided by a magnetic holder as shown more precisely in detail "x" of FIG. 3. The bottom part contains the substrate holder drive in the form of a metal tape 18, as shown in detail "Y" at FIG. 4, or a friction wheel 22, as shown in detail "Z" of FIG. 5.

Figure 3:
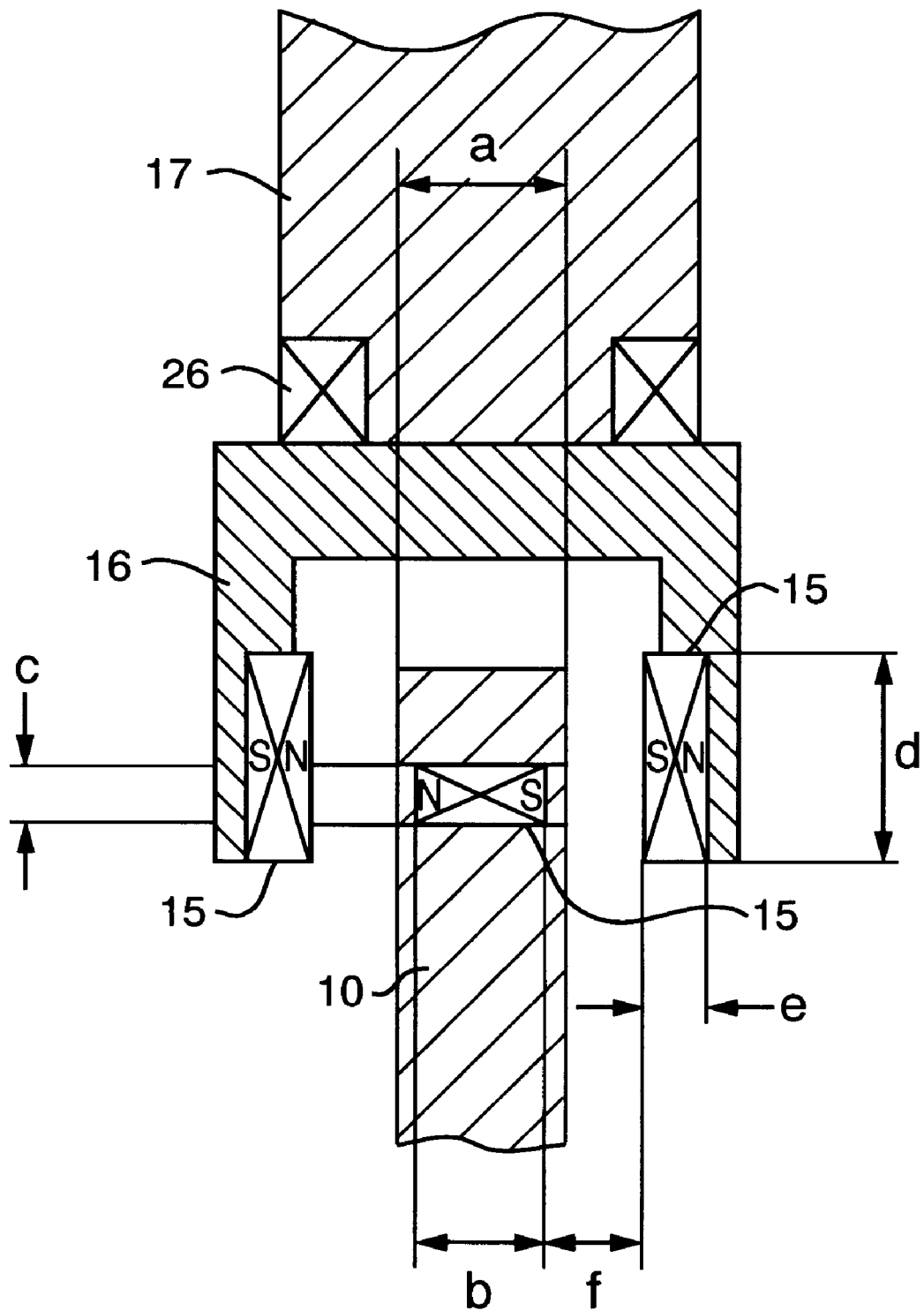
FIG. 3 is an enlarged view of detail "X" from FIG. 2a, a magnet supported guidance of the upper substrate holder part according to the invention.

FIG. 3 shows the preferred design of a magnet-assisted guiding element (detail "X"). Three rows of permanent magnets 15 are preferably used which are arranged in the upper part of substrate holder 10 as well as on the inside of a U-shaped holder 16, preferably fabricated from magnetically soft material, which positions the magnets on both sides of the substrate holder. Connecting piece 17 fastens the holder 16 firmly to top 13 of the additional wall 12. The magnets 15 are installed in such a way that magnet 10 on the substrate holder and the opposite magnet on holder 16 repel each other. This is preferably achieved by installing the magnets in such a way that like poles on the inside of holder 16 and on the outside of substrate holder 10 are positioned opposite each other. On substrate holder 10 it is possible to arrange either only one magnet, the length of which corresponds to the dimension of the substrate holder in the movement direction, or several shorter magnets which can be spaced along the top edge of substrate holder 10 to form the row of magnets. The same applies also to the magnet pairs arranged laterally on the U-shaped holder 16 which are located opposite the central magnet(s). In place of permanent magnets also electromagnets having the same effect, or a combination of permanent magnets and electromagnets can be used.

When a heater is installed on the inside of the substrate holder the substrate temperatures can reach several hundred degrees centigrade. For this reason magnet materials are preferably used that can sustain high application temperatures, such as hard ferrites. As permanent magnets lose their magnetism when a certain material-dependent temperature is exceeded, they must be protected from high ambient temperatures by suitable design measures such as the installation of shielding plates at 25 in FIGS. 2a and 2b or contact with heat sinks through which possibly a cooling fluid may be pumped at 26 in FIG. 3. Cooling devices may possibly also be needed when electromagnets are used.

In the preferred design, connecting piece 17 which serves as a mechanical holder for top 13 is made of material with excellent thermal conduction properties so that the cooling of the top also acts on the U-shaped holder 16 to which the magnets are fastened.

FIG. 3 detail "X" gives a cross-section of the magnetic guidance in the top part of substrate holder 10. In a design example the dimensions of substrate holder 10 and the permanent magnets 15 made of hard ferrite type Ox300 obtained from Magnetfabrik Bonn GmbH (Curie temperature 450° C.) were selected as follows: Thickness a of substrate holder 12 mm, width b of the central magnet 11 mm, height e of the central magnet 4 mm, width d of the lateral magnet 15 mm, height e of the lateral magnet 4 mm, and distance f between the magnets 1 to 10 mm, preferably 2 to 5 mm. The dimensions of other materials may deviate from the above because the magnet sizes must be chosen in accordance with their magnetic effect.

Figure 4A:
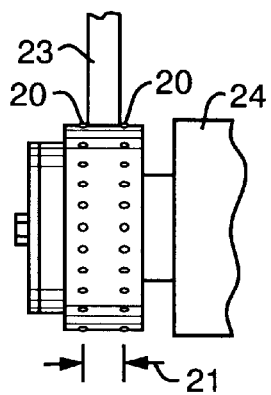
FIG. 4a is a view of detail "Y" from FIG. 2a, of a substrate holder drive using a metal tape according to the invention.
Figure 4B:
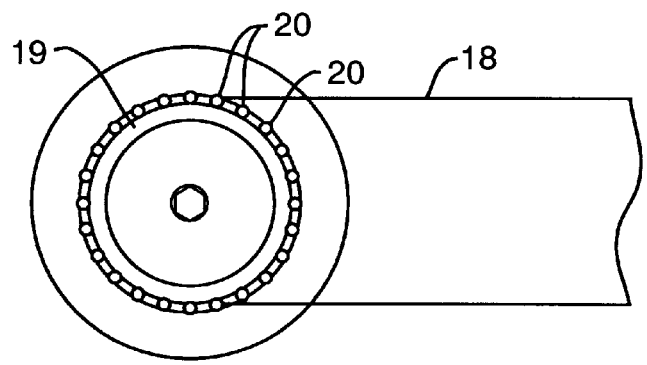

The particle-free drive by means of a tape is illustrated in FIGS. 4a and 4b. A thin, flexible tape 18 made of vacuum-resistant, flexible plastic or preferably metal, in particular made of stainless steel with two perforation strips at a distance 21 which is matched to the width of the support 23 for the lower edge area of the substrate holder 10, travels across drive wheel 19 that features two sets of pins 20 that engage in the holes of the perforation strips in transport tape 18. Support 23 of substrate holder 10 rests on tape 18. Although FIG. 4a shows only one drive wheel several such wheels can be installed for supporting the transport tape, however, not all of these wheels need to be driven. The two sets of pins in these wheels simultaneously guide transport belt 18 and substrate holder 10 resting on this tape because distance 21 in the axial direction between the two sets of pins is matched to the width of substrate holder support 23. As pins 20 in drive wheel 19 prevent any slip in the drive of transport tape 18, no friction occurs. As a result this largely eliminates the formation of particles. Drive wheel 19 is connected to a drive motor 24, the function of which can be controlled by suitable means (not shown).

Figure 5:
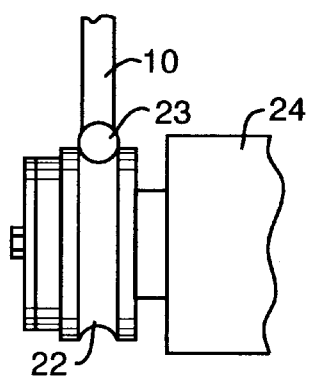
FIG. 5 is a view of detail "Z" from FIG. 2b of a substrate holder drive using a friction wheel according to the invention.

The friction wheel drive in FIG. 5 shows a support 23 at the lower end of substrate holder 10, the cross-section of which is matched to the shape of friction wheel 22. Through this design the lower end of the substrate holder is not only driven but also guided. As the essentially vertical arrangement of the substrate holder is ensured by the magnetic guide in the upper part of the substrate holder, a single set of wheels for driving and/or supporting the substrate holder suffices. This in turn minimizes the formation of particles. Drive wheel 19 is connected to drive motor 24, the function of which can be controlled by suitable means (not shown).

We claim:

1. A device for transporting a plate-shaped substrate in and through a vacuum treatment system having at least one treatment station with a parallelepiped substrate holder with an upper edge area and a lower edge area, the substrate being adapted to be held in a vertical plane in the substrate holder and the substrate holder being adapted to be held in a vertical plane in the treatment station, the device comprising:

drive means in the treatment station for engaging the lower edge area of the substrate holder for both supporting and driving the substrate holder along a horizontal transport path in the treatment station while permitting tilting of the substrate holder in a direction transversely to the horizontal transport path and about the drive means; and magnetic means in the treatment station spaced vertically above the drive means and operatively engaged with the upper edge area of the substrate holder for centering the upper edge area of the substrate holder with respect to the magnetic means to resist tilting of the substrate holder for maintaining the substrate holder vertically while the substrate holder is moved along the horizontal transport path by the drive means.

2. A device according to claim 1, wherein the drive means comprises a driven tape for receiving and supporting the lower edge area of the substrate holder and adapted for movement along the horizontal transport path; and rollers engaged with the tape for moving the tape along the horizontal transport path.

3. A device according to claim 2, including two sets of pins on each roller for guiding the lower edge area of the substrate holder along the horizontal transport path.

4. A device according to claim 1, wherein the drive means comprises friction wheels engaged with the lower edge area of the substrate holder, the friction wheels being rotatable for moving the substrate holder along the horizontal transport path.

5. A device according to claim 4, wherein each friction wheel has a cross-sectional shape which matches a cross-sectional shape of the lower edge area of the substrate holder for improving a frictional engagement between the lower edge area of the substrate holder and the friction wheel.

6. A device according to claim 1, wherein the magnetic means comprises means in the treatment station defining a gap extending along the horizontal transport path for receiving the upper edge area of the substrate holder, a first magnet in the upper edge area of the substrate holder having opposite poles on opposite sides of the upper edge area, and a pair of second magnets in the treatment station on opposite sides of the gap for mutually repelling the opposite poles of the first magnet for centering the upper edge area of the substrate holder in the gap.

7. A device according to claim 6, wherein the drive means comprises a driven tape for receiving and supporting the lower edge area of the substrate holder and adapted for movement along the horizontal transport path; and rollers engaged with the tape for moving the tape along the horizontal transport path.

8. A device according to claim 7, including two sets of pins on each roller for guiding the lower edge area of the substrate holder along the horizontal transport path.

9. A device according to claim 6, wherein the drive means comprises friction wheels engaged with the lower edge area of the substrate holder, the friction wheels being rotatable for moving the substrate holder along the horizontal transport path.

10. A device according to claim 9, wherein each friction wheel has a cross-sectional shape which matches a cross-sectional shape of the lower edge area of the substrate holder for improving a frictional engagement between the lower edge area of the substrate holder and the friction wheel.

11. A device according to claim 6, including cooling means in the treatment station for the magnetic means and shielding means in the treatment station for shielding the magnetic means.

12. A device according to claim 1, including cooling means in the treatment station for the magnetic means and shielding means in the treatment station for shielding the magnetic means.

* * * * *